US011151590B2

(12) United States Patent
Zachariah et al.

(10) Patent No.: US 11,151,590 B2
(45) Date of Patent: Oct. 19, 2021

(54) GEOGRAPHIC BOUNDARY DETERMINATION SERVICE

(71) Applicant: T-Mobile USA, Inc., Bellevue, WA (US)

(72) Inventors: Biju Thomas Zachariah, Frisco, TX (US); Dennis Jarret Guill, Jr., Richardson, TX (US); Robert Frangooles, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/080,733

(22) Filed: Oct. 26, 2020

(65) Prior Publication Data

US 2021/0065226 A1   Mar. 4, 2021

Related U.S. Application Data

(63) Continuation of application No. 15/711,383, filed on Sep. 21, 2017, now Pat. No. 10,817,889.

(51) Int. Cl.
*G06Q 30/00* (2012.01)
*G06Q 30/02* (2012.01)
(Continued)

(52) U.S. Cl.
CPC ....... *G06Q 30/0205* (2013.01); *G06F 16/248* (2019.01); *G06F 16/29* (2019.01); *G06Q 30/0639* (2013.01); *G09B 29/106* (2013.01)

(58) Field of Classification Search
CPC .............................. G06F 16/29; G06F 16/1248
See application file for complete search history.

(56) References Cited

U.S. PATENT DOCUMENTS 7,313,402 B1 * 12/2007 Rahman ................ H04W 24/06
                                                       455/456.1
7,991,638 B1 *  8/2011 House .................... G06Q 30/06
                                                         705/7.34
(Continued)

OTHER PUBLICATIONS

Qu, Yan, et al. "Trade Area Analysis using Generated Mobile Location Data." WWW 2013, May 13-17, 2013, Rio de Janeiro, Brazil. (Year: 2013).*

(Continued)

*Primary Examiner* — Luis A Brown
(74) *Attorney, Agent, or Firm* — Knobbe Martens Olson & Bear LLP

(57) ABSTRACT

Systems, methods, and computer-readable media are described for a geographic boundary determination service. A geographic boundary may be associated with one of a plurality of geographic locations, and the area within the geographic boundary may be within a specified distance of the geographic location and closer to the geographic location than to any other geographic location in the plurality of geographic locations. The geographic boundary determination service may determine geographic boundaries for existing locations or may determine a set of locations whose geographic boundaries satisfy various criteria. The geographic boundary determination service may further display geographic maps that include the geographic boundaries, demographic indices and other demographic information relating to the geographic boundaries, network coverage information relating to the geographic boundaries, and a targeted geographic region or regions that the boundaries overlap.

20 Claims, 11 Drawing Sheets

(51) Int. Cl.
*G06Q 30/06* (2012.01)
*G09B 29/10* (2006.01)
*G06F 16/29* (2019.01)
*G06F 16/248* (2019.01)

(56) References Cited

U.S. PATENT DOCUMENTS

| | | | | |
|---|---|---|---|---|
| 8,027,868 | B1* | 9/2011 | House | G06Q 30/06 |
| | | | | 705/7.34 |
| 9,760,840 | B1* | 9/2017 | Tyagi | G06Q 10/06313 |
| 2002/0173291 | A1* | 11/2002 | Hutcheson | H04L 41/22 |
| | | | | 455/408 |
| 2007/0202845 | A1* | 8/2007 | Hutcheson | G06Q 20/14 |
| | | | | 455/405 |
| 2008/0318583 | A1* | 12/2008 | Guill, Jr. | H04W 16/18 |
| | | | | 455/446 |
| 2009/0012803 | A1* | 1/2009 | Bishop, III | G06Q 50/16 |
| | | | | 705/323 |
| 2009/0076888 | A1* | 3/2009 | Oster | G06Q 10/10 |
| | | | | 705/7.34 |
| 2009/0083128 | A1* | 3/2009 | Siegel | G06Q 30/02 |
| | | | | 705/7.34 |
| 2009/0187464 | A1* | 7/2009 | Bai | G06Q 10/04 |
| | | | | 705/7.34 |
| 2009/0281869 | A1* | 11/2009 | Bai | G06Q 10/04 |
| | | | | 705/7.36 |
| 2010/0161376 | A1* | 6/2010 | Spagnolo | G06Q 10/00 |
| | | | | 705/7.34 |
| 2013/0132155 | A1* | 5/2013 | Elam | G06Q 10/00 |
| | | | | 705/7.31 |
| 2014/0278973 | A1* | 9/2014 | Lowe | G06Q 30/0205 |
| | | | | 705/14.53 |
| 2015/0058088 | A1* | 2/2015 | Unser | G06Q 30/0205 |
| | | | | 705/7.34 |
| 2015/0125042 | A1* | 5/2015 | Haden | G06K 9/00771 |
| | | | | 382/105 |
| 2015/0379537 | A1* | 12/2015 | Ghosh | G06F 16/29 |
| | | | | 705/7.34 |
| 2016/0034931 | A1* | 2/2016 | D'Agostino | G06Q 30/0205 |
| | | | | 705/7.34 |
| 2016/0042424 | A1* | 2/2016 | MacNair | G06Q 30/02 |
| | | | | 705/26.62 |
| 2017/0032390 | A1* | 2/2017 | Mack | G06F 16/29 |
| 2017/0078760 | A1* | 3/2017 | Christoph | H04N 21/2143 |
| 2017/0091795 | A1* | 3/2017 | Mansour | G06Q 30/0205 |
| 2018/0006915 | A1* | 1/2018 | Kim | H04L 43/08 |
| 2019/0087840 | A1* | 3/2019 | Zachariah | G06Q 30/0205 |

OTHER PUBLICATIONS

Search Report and Written Opinion dated Nov. 21, 2018, issued in corresponding PCT/US2018/051818.
Wang, Wei, et al. "Trade-Offs Between Mobility and Density for Coverage in Wireless Sensor Networks." MobiCom 2007, Sep. 9-14, 2007, Montreal Quebec Canada. (Year: 2007).
International Preliminary Report on Patentability dated Mar. 24, 2020, issued in corresponding PCT/US2018/051818.

* cited by examiner

| | Target Area Polygon Name | Area (SqMi) | Stores within Target Area | Total Population (POPs) | Target POPs | % Total POPs in In-Building Coverage | % Target POPs in In-Building Coverage | % Total POPs in Outdoor Coverage | % Target POPs in Outdoor Coverage |
|---|---|---|---|---|---|---|---|---|---|
| | 404A | 404B | 404C | 404D | 404E | 404F | 404G | 404H | 404I |
| 402A | Springfield | 74.4 | 7 | 155,660 | 50,814 | 96.9% | 97.7% | 100.0% | 100.0% |
| 402B | Madison | 68.7 | 5 | 133,720 | 48,261 | 94.2% | 95.8% | 99.7% | 99.9% |
| 402C | Franklin | 88.1 | 9 | 571,200 | 203,129 | 97.2% | 98.5% | 99.9% | 100.0% |

TARGET AREA DATA

| Store ID | Average Monthly Sales Volume | Trade Area Boundary (TAB) Area, SqMi | Total POPs | Target POPs | % Total POPs in In-Building Coverage | % Target POPs in In-Building Coverage | % Total POPs in Outdoor Coverage | % Target POPs in Outdoor Coverage |
|---|---|---|---|---|---|---|---|---|
| 101644 | 1696 | 4.7 | 13,274 | 5,531 | 100.0% | 100.0% | 100.0% | 100.0% |
| 101791 | 862 | 14.3 | 23,882 | 13,385 | 99.6% | 99.5% | 100.0% | 100.0% |
| 101883 | 226 | 41.5 | 34,138 | 5,523 | 94.2% | 91.7% | 99.9% | 100.0% |
| 101887 | 917 | 33.0 | 35,985 | 11,655 | 99.2% | 98.3% | 100.0% | 100.0% |
| 101890 | 1696 | 24.2 | 23,696 | 2,823 | 98.2% | 99.7% | 100.0% | 100.0% |
| 102143 | 1601 | 31.4 | 22,939 | 9,953 | 100.0% | 100.0% | 100.0% | 100.0% |
| 102645 | 618 | 27.8 | 5,969 | 524 | 77.5% | 83.4% | 100.0% | 100.0% |

*Fig. 4B*

GEOGRAPHIC BOUNDARY DETERMINATION SERVICE

CROSS-REFERENCE TO RELATED APPLICATIONS

This application is a continuation of U.S. patent application Ser. No. 15/711,383, entitled "GEOGRAPHIC BOUNDARY DETERMINATION SERVICE" and filed on Sep. 21, 2017, which is hereby incorporated by reference herein in its entirety.

BACKGROUND

Generally described, computing devices can be used to exchange information via a network. Mobile computing devices may utilize a network provided by a wireless service provider to facilitate the exchange of information in accordance with one or more wireless communication protocols. For example, a wireless service provider may maintain a wireless network that enables mobile computing devices to exchange information in accordance with a wireless telecommunications protocol. The wireless network may cover an area spanning multiple geographic locations, and thereby enable the exchange of information with mobile computing devices in the covered locations.

Wireless service providers may thus make wireless telecommunications services (e.g., exchange of information with mobile computing devices) and associated products (e.g., mobile computing devices) available to users or potential users in a variety of geographic locations. Wireless service providers may provide facilities, such as retail stores, that allow potential users to subscribe to wireless telecommunications services, allow existing users to change their subscriptions, or facilitate other interactions. These facilities may be located at particular geographic locations, which may coincide with the locations of the users and the areas covered by the wireless network.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4A is an illustrative table of example target area information that may be obtained as input to a geographic boundary determination service in accordance with aspects of the present disclosure.

FIG. 4B is an illustrative table of example geographic boundary information that may be obtained or generated by a geographic boundary determination service in accordance with aspects of the present disclosure.

DETAILED DESCRIPTION

Figure 1:
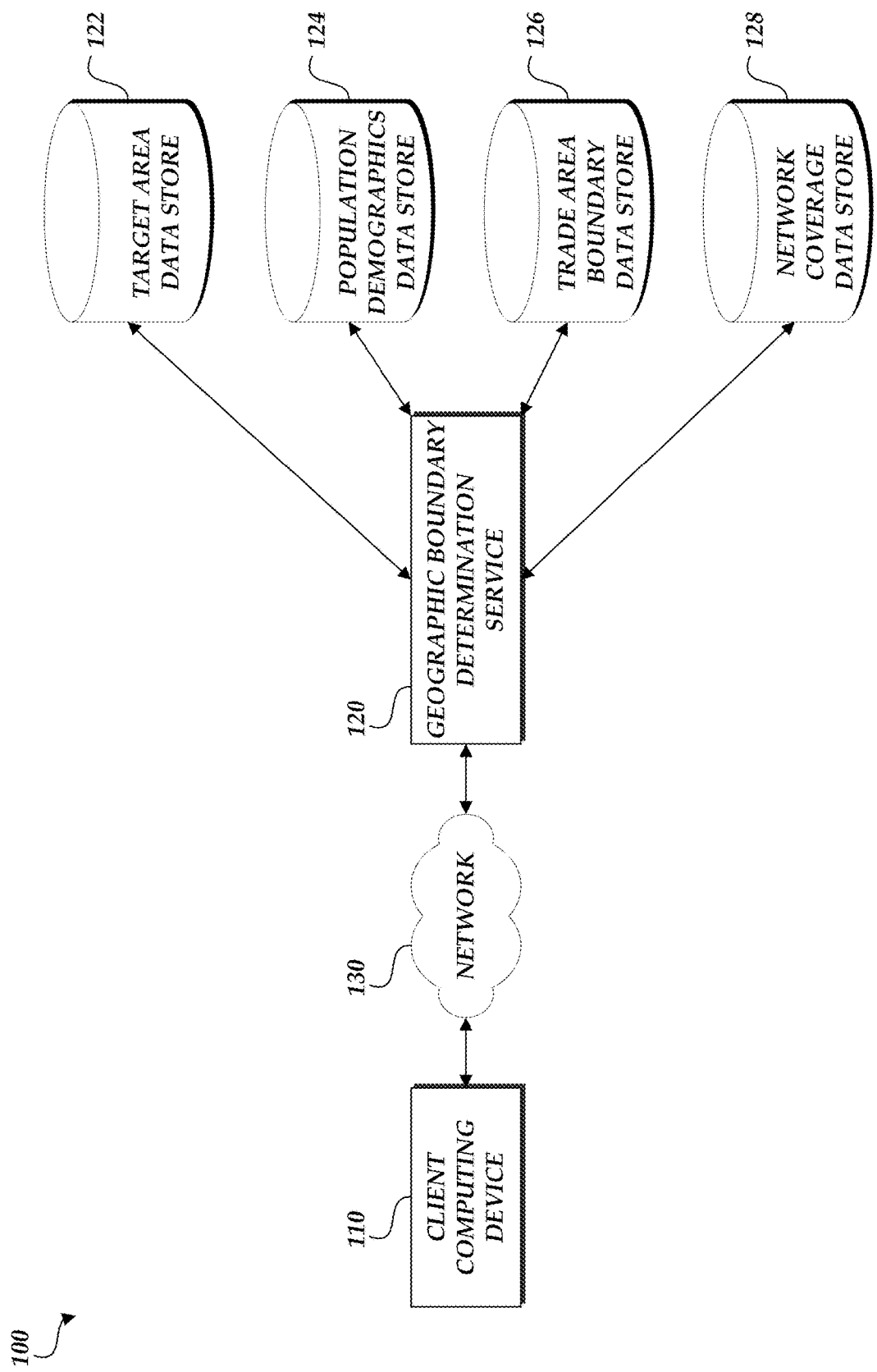
FIG. 1 is an illustrative functional block diagram of an example network environment for implementing a geographic boundary determination service in accordance with aspects of the present disclosure.

Generally described, aspects of the present disclosure relate to determining geographic boundaries. More specifically, aspects of the present disclosure are directed to systems, methods, and computer-readable media related to determining geographic boundaries in order to facilitate delivery of wireless telecommunications services and related products. Illustratively, the geographic boundaries are defined, at least in part, by evaluating various criteria with regard to population, demographics, or other metrics. In turn, a wireless service provider can utilize the defined geographic boundaries to increase efficiencies and utilization in the delivery of wireless telecommunication services. Although described herein with reference to wireless telecommunication services, it will be understood and appreciated that the present disclosure is applicable to any geographically distributed service or product.

A wireless service provider may provide wireless telecommunications services across a wide variety of urban and rural areas. For example, a wireless service provider may provide wireless telecommunication services in a city and the surrounding area, and may deliver different types or levels of service in different areas according to factors such as demand or population density. A wireless service provider may, for example, deliver a high-speed wireless data service in some areas, or may provide wireless services at a level of signal strength that supports indoor or "in-building" services in some areas, while providing a signal strength that supports outdoor-only services in other areas.

Wireless service providers may further provide facilities at which users of wireless services (or potential users of wireless services) may obtain or upgrade wireless services, wireless products, technical support services, and the like. For example, a wireless service provider may facilitate delivery of wireless services through a set of retail stores or other delivery points, each of which may be associated with a nearby geographic region and a corresponding set of users. To ensure that more users have access, the delivery points may be geographically dispersed. However, the geographic locations of the delivery points may be suboptimal due to differences in population density, population demographics, network coverage, or other factors across the geographic region in which the wireless service provider operates. It may further be difficult to determine the performance of a particular delivery point relative to factors such as network coverage or population demographics.

Accordingly, a wireless service provider may implement a geographic boundary determination service as described herein. As used herein, a geographic boundary determination service is a service that determines geographic boundaries, which may also be referred to herein as "trade area boundaries," to associate with each of a set of delivery points, enabling assessment of the performance of a delivery point relative to factors such as population, demographics, network coverage, and the like. Illustratively, a trade area boundary associated with one of a set of delivery points may enclose all points that are both within a specified distance of the delivery point and closer to that delivery point than any other. In some embodiments, trade area boundaries may be determined by generating a Voronoi partition of a geographic area, and then bounding any of the Voronoi partitions that extend more than a specified distance from their associated delivery point. The trade area boundaries, in such embodiments, may thus be determined by (i) generating a circle whose center is the associated delivery point and whose radius is the specified distance, (ii) generating the Voronoi partition that includes the associated delivery point, and (iii) determining the area that is included in both the circle and the Voronoi partition.

In some aspects, the geographic boundary determination service may determine whether trade area boundaries meet certain criteria with regard to the geographic location associated with the trade area boundary. In other aspects, a geographic boundary determination service may be utilized to determine and assess the impact of adding a new geographic location to a set of existing geographic locations, or to determine a set of geographic locations where none existed previously. For example, a geographic boundary determination service may determine that a potential geographic location for a new delivery point will not significantly reduce trade area boundaries of other nearby delivery points (e.g., because the trade area boundary of the potential geographic location will support delivery of wireless services to users who are outside existing trade area boundaries). As a further example, a geographic boundary determination service may determine that a potential geographic location for a new delivery point will overlap and reduce the size of existing trade area boundaries without significantly increasing the area or population that is covered in total.

In some aspects, the geographic boundary determination service may determine trade area boundaries for a target geographic region. A target geographic region or "target area" may be a region in which the wireless service provider provides, or plans to provide, wireless telecommunications services. In further aspects, as described in more detail below, the target area may be defined according to demographics, population densities, or other criteria, which may be represented by demographic indices or other such measurements.

It will be understood that aspects described herein represent significant technological improvements that enable a computing system to perform tasks not previously performable by a computing system (or, for that matter, by one of skill in the art). It will be further understood that the technical solutions described herein address technical issues that arise in the context of computing networks and wireless telecommunications networks.

FIG. 1 is a block diagram of an example network environment 100 for implementing a geographic boundary determination service 120 in accordance with aspects of the present disclosure. In the example network environment 100, a client computing device 110 communicates with the geographic boundary determination service 120 via a network 130. The client computing device 110 may illustratively be any computing device that implements aspects of the present disclosure, such as displaying the user interfaces depicted in FIGS. 3A-3E. In some embodiments, the client computing device 110 may be omitted or may be combined with the geographic boundary determination service 120. The geographic boundary determination service 120 is described in more detail with reference to FIG. 2 below.

The network 130 may illustratively be any wired or wireless network, including but not limited to a local area network (LAN), wide area network (WAN), mesh network, cellular telecommunications network, the Internet, or any other public or private communications network or networks. In some embodiments, the geographic boundary determination service 120 may further communicate with a target area data store 122, population demographics data store 124, trade area boundary data store 126, and network coverage data store 128 via the network 130 or another network.

The geographic boundary determination service 120 may communicate with one or more data stores, such as the data stores 122-128, and may obtain or store data in one or more of the data stores. The data stores 122-128 may each generally be any non-transitory computer readable medium, including but not limited to a magnetic medium (e.g., a hard disk drive), optical medium, solid state device, flash drive, and the like. In some embodiments, one or more of the data stores 122-128 may be implemented as a database, database server, or other server. In various embodiments, the data stores 122-128 may be implemented as a single data store, separate data stores, or any combination thereof. In further embodiments, one or more of the data stores 122-128 may be implemented as component(s) of the geographic boundary determination service 120.

It will be understood that FIG. 1 is provided for purposes of example, and that network environments containing more, fewer, different, or different arrangements of components relative to network environment 100 are within the scope of the present disclosure.

Figure 2:
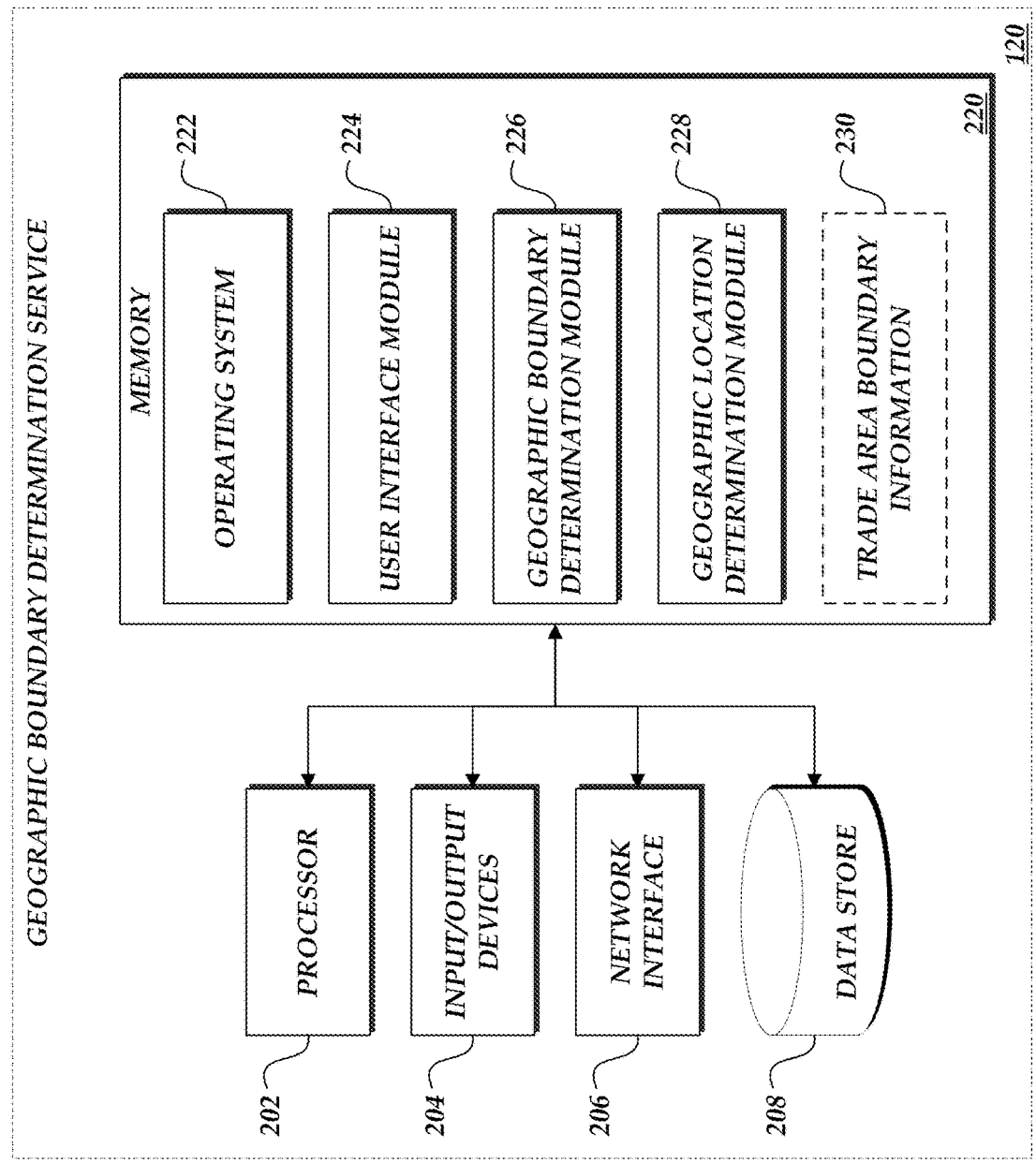
FIG. 2 is an illustrative functional block diagram of a computing device that implements a geographic boundary determination service in accordance with aspects of the present disclosure.

FIG. 2 is an illustrative block diagram depicting a general architecture of the geographic boundary determination service 120, which includes an arrangement of computer hardware and software that may be used to implement aspects of the present disclosure. The geographic boundary determination service 120 may include more (or fewer) elements than those displayed in FIG. 2. It is not necessary, however, that all of these elements be shown in order to provide an enabling disclosure.

As illustrated, the geographic boundary determination service 120 includes a processor 202, input/output devices 204, a network interface 206, and a data store 208, all of which may communicate with one another by way of a communication bus. The input/output devices 204 may include devices for displaying and interacting with user interfaces, such as the user interfaces depicted in FIGS. 3A-3E. The network interface 206 may provide connectivity to one or more networks (such as the network 130 of FIG. 1) or computing systems and, as a result, may enable the geographic boundary determination service 120 to receive and send information and instructions from and to other computing systems or services. The data store 208 may, in some embodiments, implement the target area data store 122, population demographics data store 124, trade area boundary data store 126, and/or the network coverage data store 128 of FIG. 1.

The processor 202 may also communicate to and from a memory 220. The memory 220 may contain computer program instructions (grouped as modules or components in some embodiments) that the processor 202 may execute in order to implement one or more embodiments. The memory 220 generally includes RAM, ROM, and/or other persistent, auxiliary, or non-transitory computer-readable media. The memory 220 may store an operating system 222 that provides computer program instructions for use by the processor 202 in the general administration and operation of the geographic boundary determination service 120. The memory 220 may further store specific computer-executable instructions and other information (which may be referred to herein as "modules") for implementing aspects of the present disclosure.

In some embodiments, the memory 220 may include a user interface module 224, which may be executed by the processor 202 to perform various operations, such as generating and displaying the user interfaces described with reference to FIGS. 3A-3E below. The memory 220 may further include a geographic boundary determination module 226, which may carry out, for example, the geographic boundary determination routine 500 depicted in FIG. 5. The memory 220 may still further include a geographic location determination module 228, which may similarly carry out, for example, the geographic location determination routine 600 depicted in FIG. 6. The memory 220 may still further include trade area boundary information 230 that is determined by the geographic boundary determination module 226 (or, in some embodiments, obtained from the data store 208) and loaded into the memory 220 as various operations are performed.

While the operating system 222, the user interface module 224, the geographic boundary determination module 226, and the geographic location determination module 228 are illustrated as distinct modules in the memory 220, in some embodiments, the user interface module 224, the geographic boundary determination module 226, and the geographic location determination module 228 may be incorporated as modules in the operating system 222 or another application or module, and as such, separate modules may not be required to implement some embodiments. In some embodiments, user interface module 224, the geographic boundary determination module 226, and the geographic location determination module 228 may be implemented as parts of a single application.

It will be recognized that many of the components described in FIG. 2 are optional and that embodiments of the geographic boundary determination service 120 may or may not combine components. Furthermore, components need not be distinct or discrete. Components may also be reorganized. For example, the geographic boundary determination service 120 may be represented in a single physical device or, alternatively, may be split into multiple physical devices. In some embodiments, components illustrated as part of the geographic boundary determination service 120 may additionally or alternatively be included in other computing devices, such that some aspects of the present disclosure may be performed by the geographic boundary determination service 120 while other aspects are performed by another computing device.

Figure 3A:
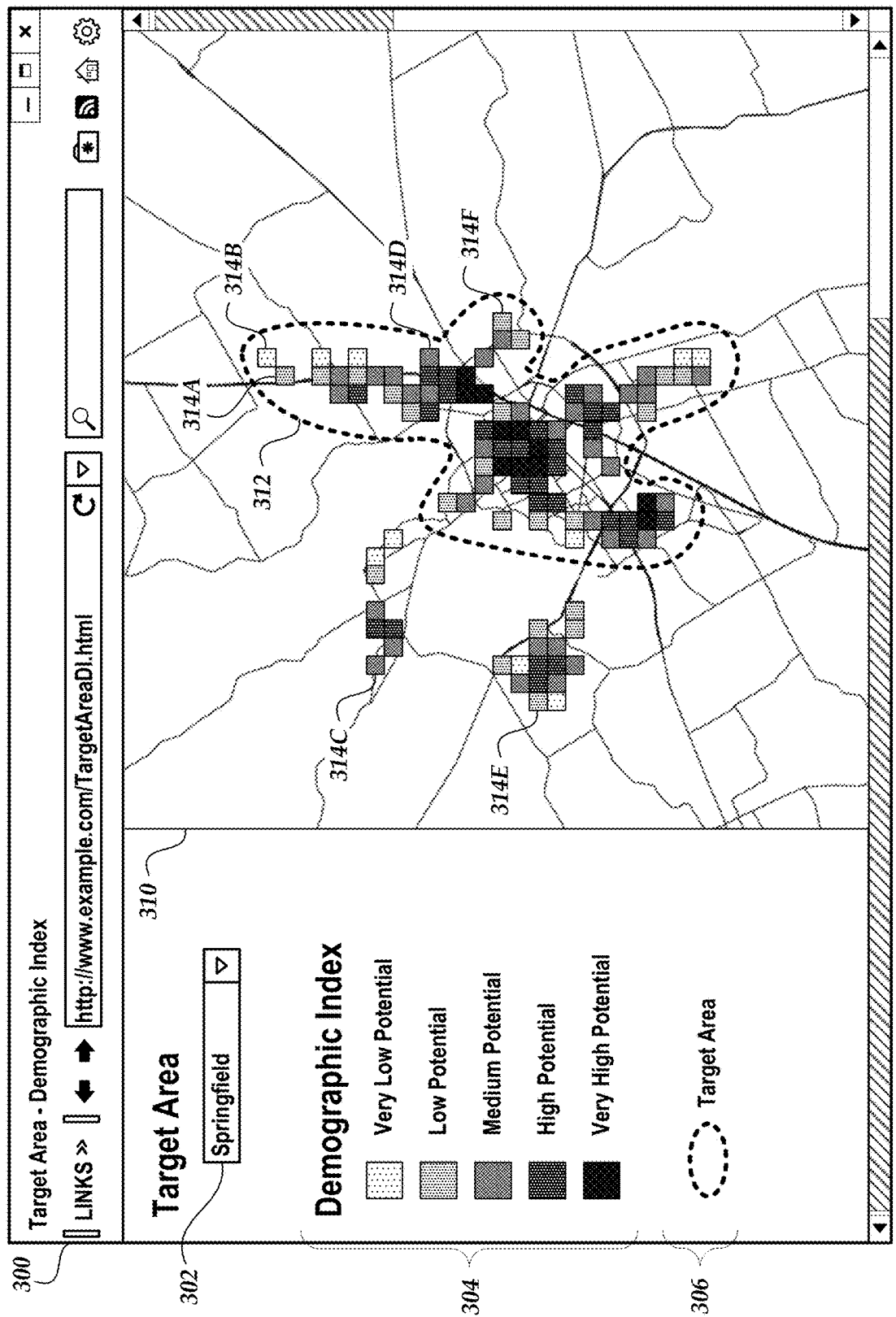
FIGS. 3A-3E are pictorial diagrams of illustrative user interfaces generated by a geographic boundary determination service in accordance with aspects of the present disclosure.

FIG. 3A is a pictorial diagram of an illustrative user interface 300 generated by a geographic boundary determination service in accordance with aspects of the present disclosure. The user interface 300 includes a target area selector 302, which enables selection and display of a particular target geographic region 312. The user interface 300 further includes a demographic index legend 304, which displays information regarding demographic index representations 314A-F displayed on the map display 310. The user interface 300 still further includes a target area legend 306, which identifies the target geographic region 312 on the map display 310.

The map display 310 displays a geographic map that includes the target geographic region 312 and surrounding areas. In FIG. 3A, the map display 310 further displays a number of demographic index representations 314A-F, each of which corresponds to a different sub-region of the displayed geographic map. Illustratively, in some embodiments, the geographic map may be divided into a grid of cells, and individual demographic index representations 314A-F may correspond to particular cells defined by the grid. The individual demographic index representations 314A-F may be visual representations indicative of results of determining a demographic index for each of the grid cells. The demographic indices may combine selected demographic information in a plurality of categories for each of the different sub-regions. An example of a demographic index model is provided in U.S. Pat. No. 8,185,122, entitled METHOD FOR CREATING A CELLULAR TELEPHONE INFRASTRUCTURE and filed Feb. 4, 2008, the entirety of which is incorporated herein by reference.

As shown in FIG. 3A, the demographic index representations 314A-F may be displayed for sub-regions both within and outside the target geographic region 312. The demographic index representations 314A-F may be associated with various visual cues or attributes, such as shading, coloring, highlighting, or otherwise distinct display. For example, the demographic indices of a particular sub-region may have a very high, high, medium, low, or very low potential of using a particular product or service, such as a wireless telecommunications service.

In some embodiments, the target geographic region 312 may be determined based at least in part on demographic indices, using clustering algorithms or other techniques to identify a set of demographic indices to include within the target geographic region 312. For example, a target geographic region 312 may be determined that satisfies various criteria with regard to the sub-regions and demographic indices that it covers.

In various embodiments, the user interface 300 may include more or fewer elements than those depicted in FIG. 3A. For example, the target area legend 306 may be omitted or may be combined with the demographic index legend 304. As a further example, the user interface 300 may include controls that enable a user to filter the display of demographic index representations 314A-F and only display representations 314A-F that meet particular criteria. The user interface 300 is thus understood to be provided for purposes of example and is not limiting.

Figure 3B:
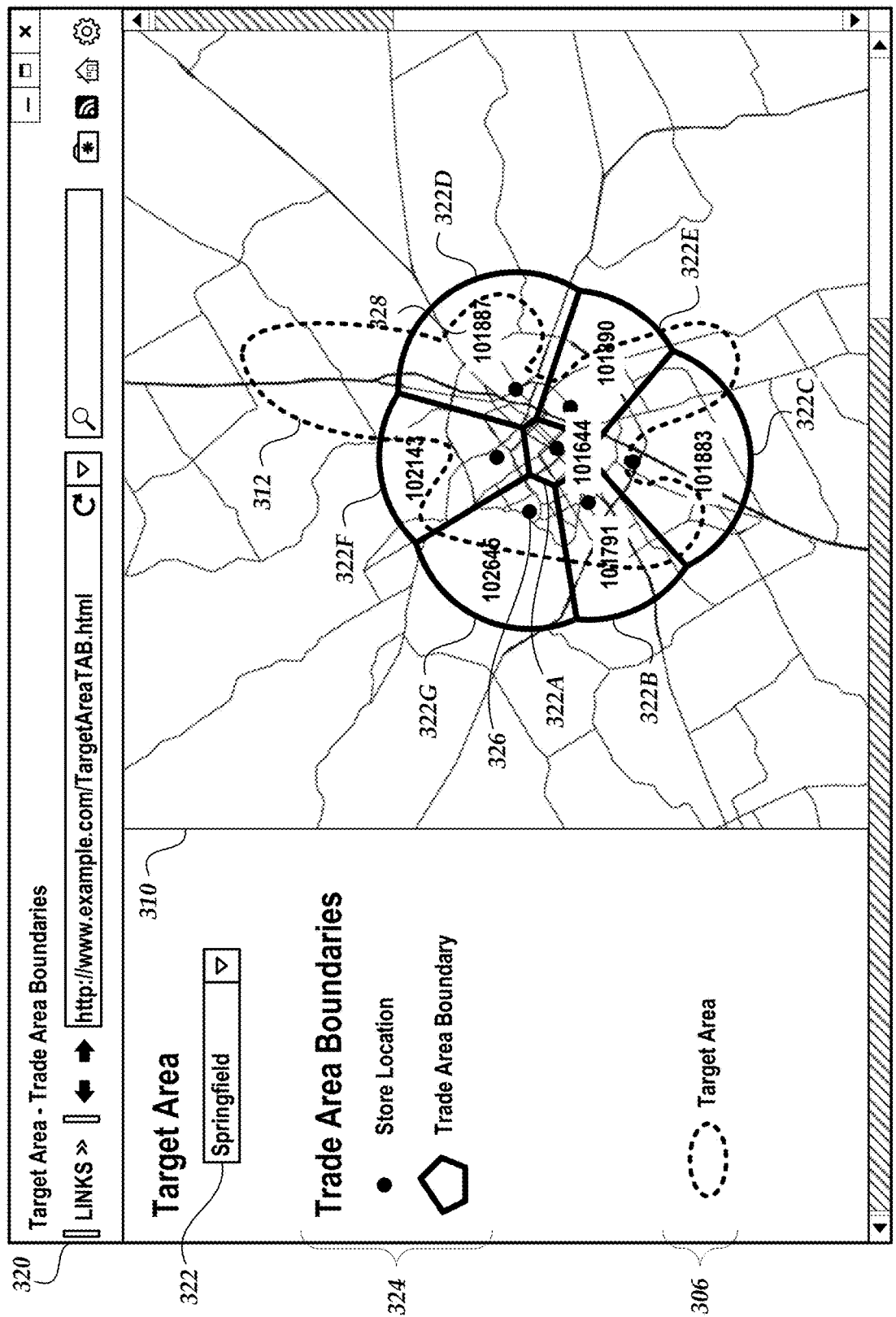

FIG. 3B is a pictorial diagram of a second illustrative user interface 320 generated by a geographic boundary determination service in accordance with aspects of the present disclosure. The user interface 320 includes the target area selector 302, the map display 310, and the target geographic region 312 as described in FIG. 3A. The user interface 320 further includes a trade area boundaries legend 324, which provides information regarding the display of trade area boundaries 322A-G on the map display 310. Each trade area boundary 322A-G may be associated with a geographic location, such as the geographic location 326 associated with trade area boundary 322G. Each trade area boundary 322A-G may be further associated with a trade area boundary identifier, such as the trade area boundary identifier 328 (the number "101887") associated with trade area boundary 322D. For clarity of illustration, only a single example of a geographic location indicator 326 and a trade area boundary identifier 328 have been identified in FIG. 3B, although it will be understood that multiple examples of each are depicted in FIG. 3B and throughout.

As described in more detail above, the trade area boundaries 122A-G each enclose a region of the map display 310 that meets certain criteria with regard to the geographic location associated with the trade area boundary. In various embodiments, the trade area boundaries 322A-G may be shaded, colored, or otherwise highlighted to distinguish them from each other and from regions not included in the trade area boundaries 322A-G. In further embodiments, individual trade area boundaries 322A-G may be selectable. For example, selection of a trade area boundary 322A-G may enable display of additional information regarding the selected trade area boundary, such as the information described in the example trade area boundary data table 450 of FIG. 4B.

Still further, in some embodiments, the user interface 320 may enable interactive "what if" scenarios. For example, user input via the user interface 320 may add, remove, or relocate a store location, and the user interface 320 may generate and display updated trade area boundaries that reflect such changes. The user interface 320 may further obtain and display information regarding the updated trade area boundaries, such as predicted sales volumes, network coverage, or population demographics within the updated trade area boundaries. In further embodiments, the user interface 320 may display a recommended store location or locations based on predictive analyses of trade area boundaries.

Figure 3C:
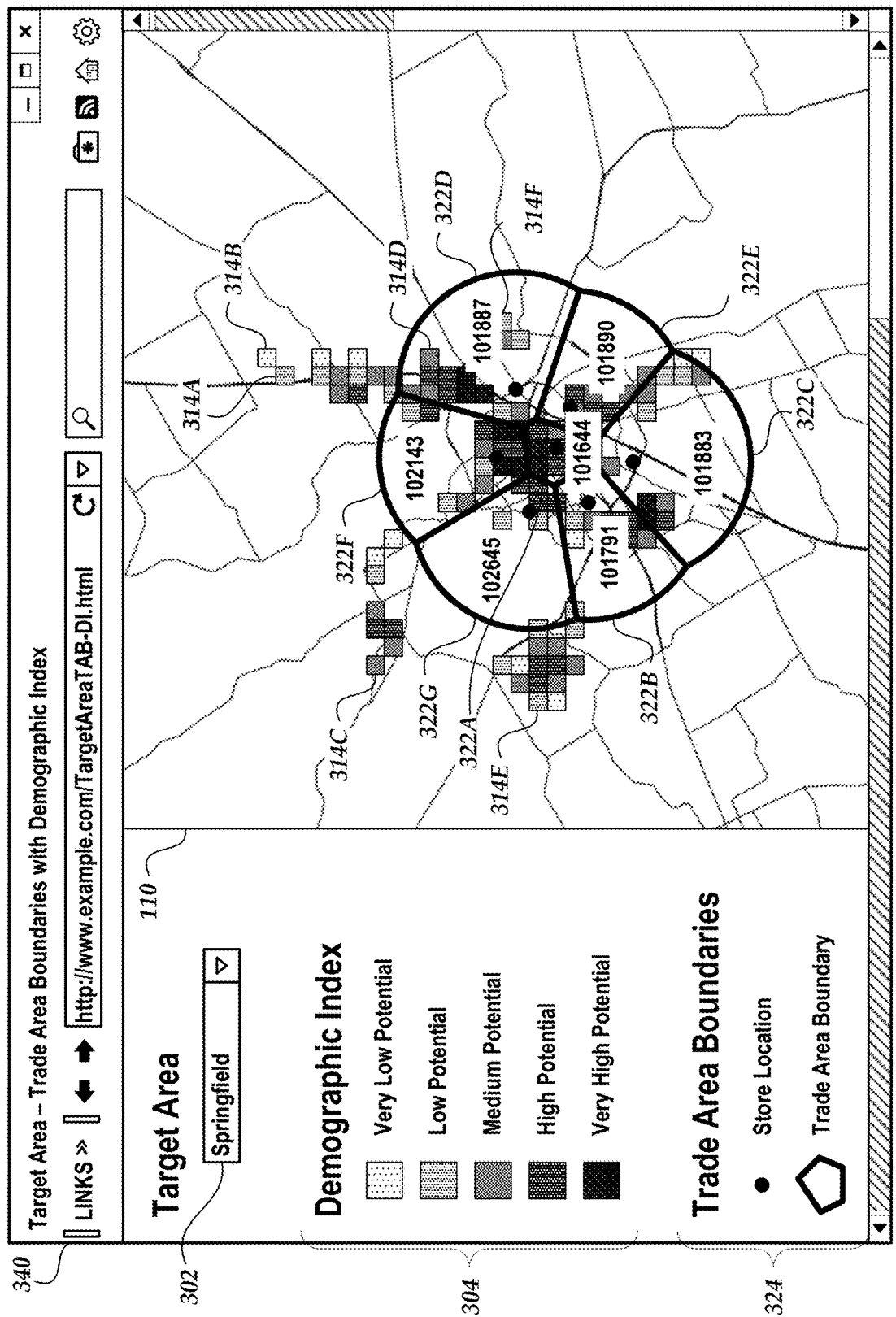

FIG. 3C is a pictorial diagram of a third illustrative user interface 340 generated by a geographic boundary determination service in accordance with aspects of the present disclosure. The user interface 340 combines elements of the user interfaces 300 and 320, including the demographic index representations 314A-F and the trade area boundaries 322A-G, and thereby enables association and visualization of particular demographic indices with respective trade boundaries 322A-G. For example, the map display 310 in FIG. 3C identifies clusters of demographic index representations that are outside any of the trade area boundaries 312A-G, which may indicate underserved populations with high potential. In some embodiments, as described above, the user interface 340 may display a recommended store location or locations based on the demographic indices, any existing trade area boundaries 322A-G, and projected trade area boundaries (not shown in FIG. 3C) if a new store location is added.

In further embodiments (not shown in FIG. 3C), the user interface 340 may further display the target geographic region 312, and may display information regarding demographic index representations that are within the target geographic region 312, within the trade area boundaries 312A-G, one but not the other, both, or neither. In still further embodiments, the user interface 340 may display demographic information independently of the demographic index representations. For example, the user interface 340 may display the total population of the target geographic region 312, the total population that is within both the target geographic region 312 and one of the trade area boundaries 322A-G, and the total population that is within the target geographic region 312 but outside the trade area boundaries 322A-G. As a further example, the user interface 340 may display demographic information regarding a target population that is outside both the target geographic region 312 and the trade area boundaries 322A-G. It will be understood that many such variations are within the scope of the present disclosure.

Figure 3D:
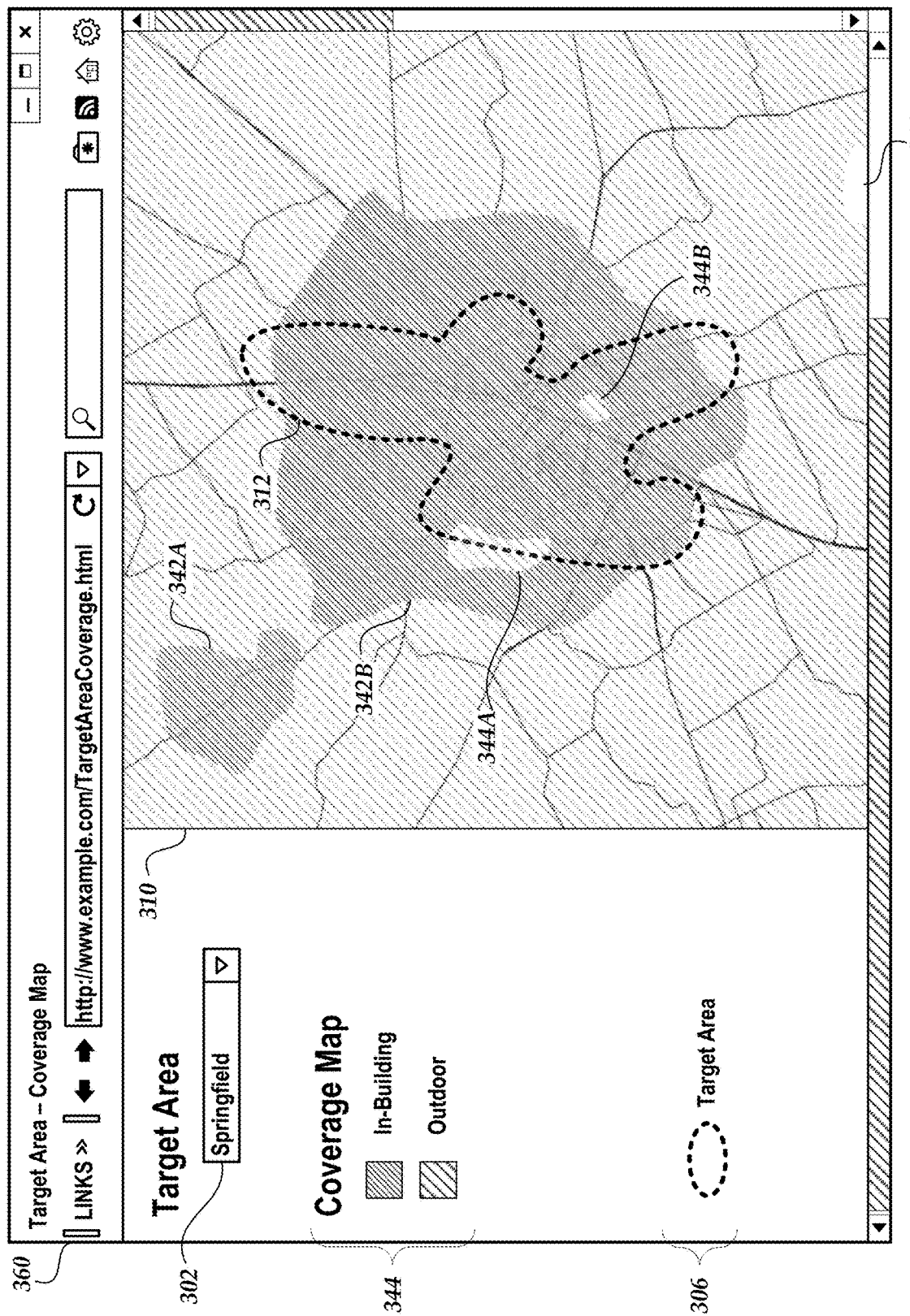

FIG. 3D is a pictorial diagram of a fourth illustrative user interface 360 generated by a geographic boundary determination service in accordance with aspects of the present disclosure. The user interface 360 includes the target geographic region 312 and other user interface elements as previously described, as well as a network coverage map legend 344, in-building coverage regions 342A-B, and outdoor coverage regions 344A-B. The map display 310 may also display regions, such as region 346, where no coverage is available. Illustratively, the user interface 360 may indicate whether (and to what extent) a wireless network provides service in the region(s) displayed in the map display 310. In various embodiments, the user interface 360 may display various types of network coverage associated with different wireless networks and protocols, such as Wi-Fi "hotspot" coverage, LTE coverage, HSPA+ coverage, and so forth. In further embodiments, the user interface 360 may display a thematic map or "heat map" indicating the relative strength of coverage in various geographic areas.

The user interface 360 may further display information regarding coverage within the target geographic region 312, such as a percentage of the target area that has in-building coverage (e.g., that overlaps in-building coverage region 342B) or a percentage of the target geographic region 312 with outdoor coverage. It will be understood that in-building coverage regions 342A-B indicate that both indoor and outdoor coverage is available, and thus outdoor coverage is available in 100% of the target geographic region 312 as shown in the illustrated map display 310.

Figure 3E:
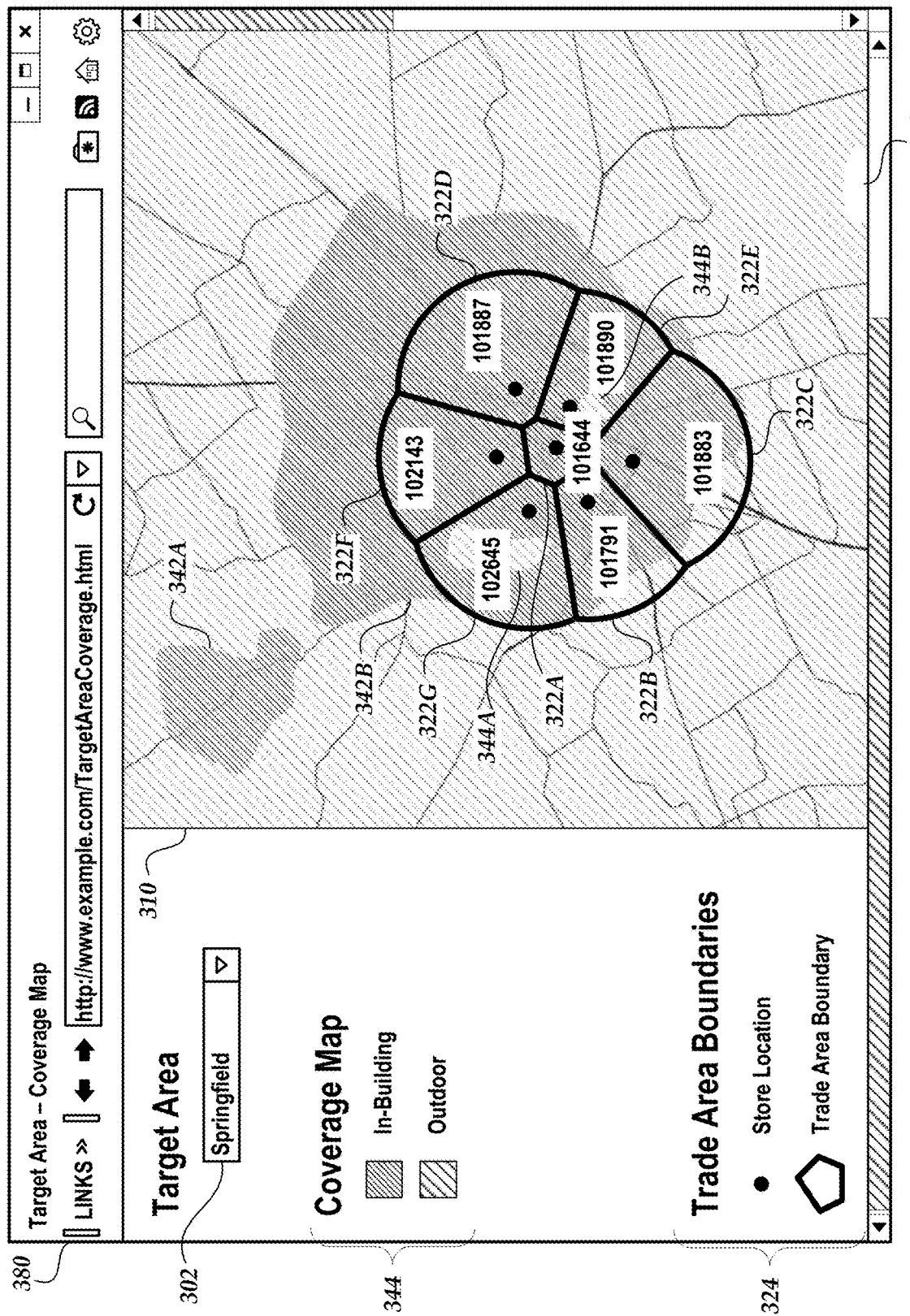

FIG. 3E is a pictorial diagram of a fifth illustrative user interface 380 generated by a geographic boundary determination service in accordance with aspects of the present disclosure. The user interface 380 combines elements of the user interfaces 320 and 360, including the trade area boundaries 322A-G, in-building coverage regions 342A-B, outdoor coverage regions 344A-B, and other user interface elements as previously described. Illustratively, the user interface 380 may be utilized to determine and visualize network coverage within trade area boundaries 322A-G.

In some embodiments, the user interface 380 may further include display of a target geographic region 312, demographic index representations 314A-F, or other elements of user interfaces 300, 320, 340, and 360. In further embodiments, the user interfaces depicted in FIGS. 3A-3E may include controls that enable user selection of which elements to display or selection of a particular user interface. For example, the user interface 380 may include checkboxes that toggle display of a target geographic region 312 or the demographic index representations 314A-F. As a further example, the user interface 380 may allow selection of a particular trade area boundary 322A-G and display of information specific to the individual trade area boundary 322A-G.

It will be understood that FIGS. 3A-3E are provided for purposes of example, and that user interfaces with more, fewer, or different combinations of controls than those depicted in FIGS. 3A-3E are within the scope of the present disclosure. For example, a user interface may be provided that includes information regarding the target geographic region 312 or the trade area boundaries 322A-G in the form of a list or table, in addition to or in place of a map display 310. As a further example, controls may be provided that enable panning, zooming, or otherwise changing the geographic area displayed in the map display 310, and changing the geographic area displayed may cause different trade area boundaries, target areas, demographic indices, or network coverage regions to be displayed.

FIG. 4A is an illustrative table 400 of example target area information that may be obtained as input to a geographic boundary determination service in accordance with aspects of the present disclosure. The target area information may be obtained from a data store, such as the target area data store 122 of FIG. 1. In the illustrated table 400, information for various target areas is provided in rows 402A-C. Illustratively, row 402A may correspond to the "Springfield" target geographic region 312 displayed in FIGS. 3A-3E.

The table 400 may include columns 404A-J, each of which contains information regarding target areas. For example, column 404C indicates a number of stores (geographic locations) within each of the target areas, and column 404F indicates a percentage of the total population in the target area that is covered by in-building coverage. It will be understood that columns 404A-J are provided for purposes of example, and that various embodiments may include more, fewer, or different columns, and may obtain or store target area information in other formats.

In some embodiments, a geographic boundary determination service may determine all or part of the information in the table 400. For example, a geographic boundary determination service may determine the information in column 404F (percentages of the total population in in-building coverage) based on demographic indices, coverage maps, and information regarding the geographic boundaries of the target area.

FIG. 4B is an illustrative table 450 of example trade area boundary data that may be obtained or generated by a geographic boundary determination service in accordance with aspects of the present disclosure. The trade area boundary data may be stored, for example, in the trade area boundary data store 126 of FIG. 1. In the illustrated table 450, rows 452A-G correspond to the trade area boundaries 422A-G depicted in FIGS. 3A-3E. The table 450 may include columns 454A-J, each of which contains information regarding trade area boundaries. For example, column 454E indicates a total target population (e.g., a subset of the total population having certain characteristics, such as being of a certain age or income level) that reside in or are otherwise associated with each of the trade area boundaries.

In some embodiments, a geographic boundary determination service may determine trade area boundary data when determining trade area boundaries. For example, the geographic boundary determination service may extrapolate from existing trade area boundaries to estimate an average monthly sales volume for a new trade area boundary, or may determine a total number of POPs (population) in a trade area boundary based on other data sources, such as demographic indices or other demographic data. As a further example, a geographic boundary determination service may determine a percentage of population in a trade area boundary that is covered by in-building coverage using coverage maps and population density information. The geographic boundary determination service may further compare trade area boundary data with geographic location performance data to determine performance metrics or indicators for particular geographic locations. For example, the geographic boundary determination service may assess the performance of a retail store location relative to the number and demographics of potential subscribers within the trade area boundary, and may identify underperforming or high-performing geographic locations.

It will be understood that columns 454A-J of FIG. 4B are provided for purposes of example, and that embodiments of the present disclosure may obtain or generate more, fewer, or different columns of information. It will further be understood that embodiments of the present disclosure may obtain or store trade area boundary information in other formats. For example, trade area boundary information may be stored in multiple tables, in a relational database, or in other data structures.

Figure 5:
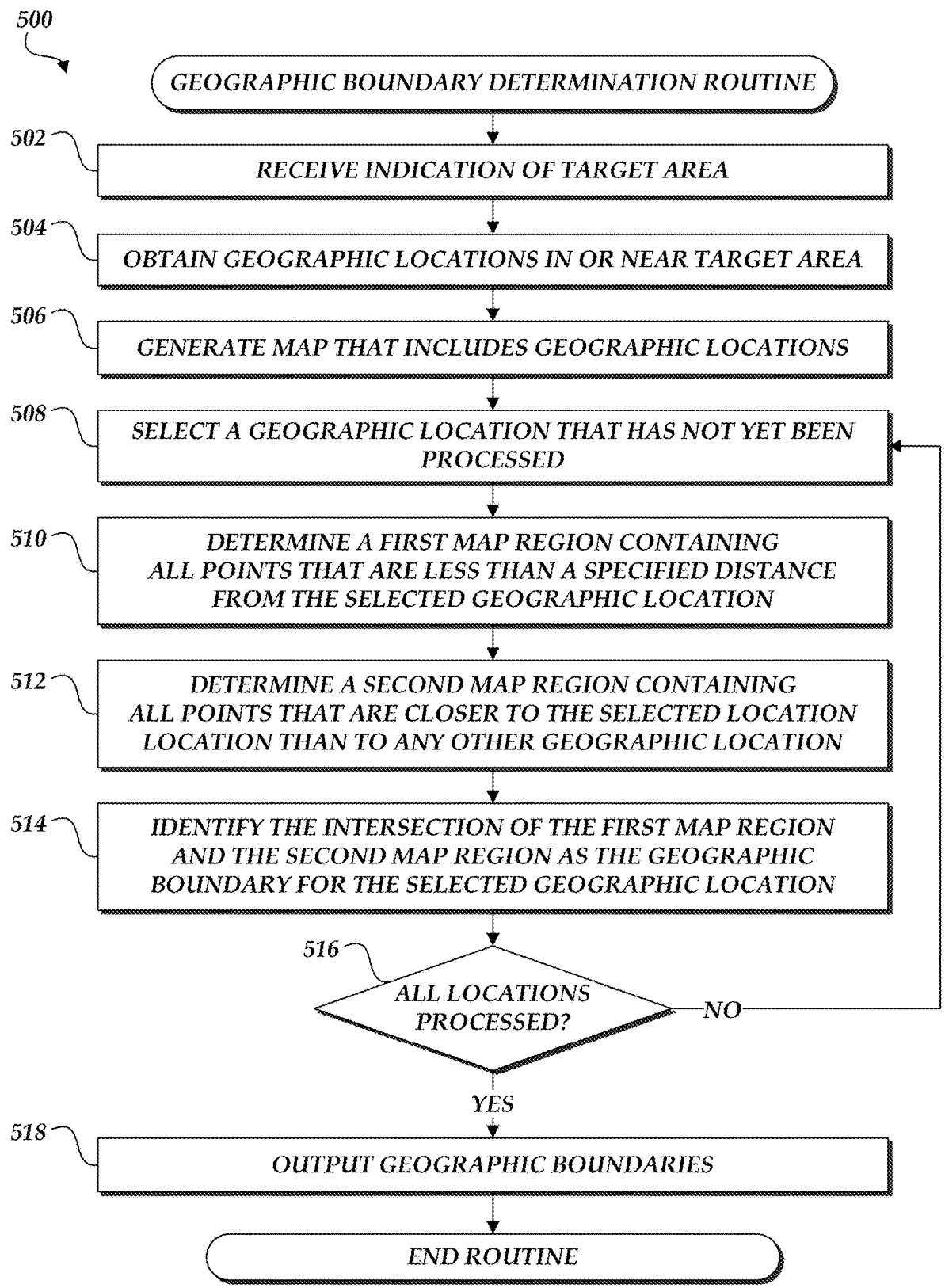
FIG. 5 is a flow diagram depicting an illustrative geographic boundary determination routine that may be implemented by a geographic boundary determination service in accordance with aspects of the present disclosure.

FIG. 5 is a flow diagram depicting an illustrative geographic boundary determination routine 500 that may be implemented in accordance with aspects of the present disclosure. The illustrative routine 500 may be implemented, for example, by the geographic boundary determination service 120 of FIG. 1. At block 502, an indication of a target area may be received. The indication may illustratively be selection of a target area via a user interface, such as the user interfaces depicted in FIGS. 3A-3E. In some embodiments, the indication may be a request to generate a target area for a geographic region of interest, based on demographic indices or other demographic information relating to the geographic region.

At block 504, identification of a plurality of geographic locations in or near the target area may be obtained. Illustratively, the geographic locations may be locations within the target area, locations within a specified distance of the target area, or combinations thereof. In various embodiments, the geographic locations may be associated with identifiable physical locations, such as retail stores, distribution centers, police stations, fire stations, hospitals, or other providers of goods or services that may be associated with a geographic region. In some embodiments, as described in more detail below with reference to FIG. 6, the plurality of geographic locations may be determined or selected according to demographic criteria or other criteria. For example, the wireless service provider may expand the geographic coverage area of its wireless network, and geographic locations may be determined for potential retail stores in the newly covered area.

At block 506, a map may be generated that includes the geographic locations. In some embodiments, the map may be generated in a format suitable for display in a user interface, such as one of the user interfaces depicted in FIGS. 3A-3E. In other embodiments, the map may be generated in a non-visual representation. It will be understood that the map may use various techniques (e.g., Mercator projection, Gall-Peters projection, etc.) to represent the curvature of the Earth on a flat surface. At block 508, a geographic location that does not yet have an associated geographic boundary may be selected.

At block 510, a first map region may be determined that contains all points on the map that are less than a specified distance from the selected geographic location. Illustratively, as described above, the first map region may be a circle that is centered on the geographic location and has a radius that corresponds to the specified distance.

At block 512, a second map region may be determined that contains all points on the map that are closer to the selected geographic location than to any other geographic location in the set of geographic locations obtained at block 504. Illustratively, the second map region may be determined by generating a Voronoi partition of the map and identifying the Voronoi cell that contains the selected geographic location. In some embodiments, the second map region may be an irregular polygon with a number of sides corresponding to the number of neighboring geographic locations. For example, if the selected geographic location has six nearby neighbors, then the second map region may be an irregular hexagon (e.g., the trade area boundary 322A of FIG. 3B). As a further example, the irregular polygon may extend to the edges of the map (e.g., if no other geographic location in the set is closer to points on the edge of the map), and the boundaries of the polygon may thus include both sides corresponding to neighboring geographic locations and sides corresponding to edges of the map.

At block 514, a geographic boundary for the selected geographic location may be determined by identifying the intersection (overlap) between the first map region and the second map region. In some embodiments, the overlap between the first map region and the second map region may correspond to the second map region. For example, the trade area boundary 322A of FIG. 3B is bounded on all sides by other trade area boundaries 322B-G, and thus the trade area boundary 322A corresponds to a second map region determined at block 512. In other embodiments, the overlap between the first and second map regions may be bounded by either map region. For example, the trade area boundary 322B is bounded on three sides by other trade area boundaries 322A, 322C, and 322G, but the fourth side is an arc that corresponds to a first map region (e.g., a maximum specified distance from the associated geographic location). In further embodiments (e.g., when the specified maximum distance from the geographic location is less than half the distance to the nearest neighbor), the geographic boundary for the selected geographic location may correspond to the first map region.

At decision block 516, a determination may be made as to whether all geographic locations have been processed and a geographic boundary has been determined for each geographic location. If not, then the routine 500 branches to block 508, where another geographic location may be selected, and the routine 500 then iterates through blocks 510-516 until all geographic locations have been processed. Once all the geographic locations have been processed, the routine 500 branches to block 518, where the determined geographic boundaries may be output. Illustratively, the geographic boundaries may be output for display in a user interface, such as the user interfaces depicted in FIGS. 3A-3E, or provided as input to a further routine, such as the geographic location determination routine 600 of FIG. 6. Thereafter, the routine 500 ends.

In some embodiments, as discussed above, the routine 500 may determine demographic information or other data pertaining to the determined geographic boundaries. In further embodiments, the routine 500 may obtain metrics or other data pertaining to the geographic locations, and may analyze these metrics relative to the geographic boundary data. For example, demographic indices may be obtained for sub-regions of the geographic boundaries, and these demographic indices may be aggregated, averaged, or otherwise processed to generate expected performance metrics for a retail store location corresponding to one of the geographic locations. Actual performance metrics for the retail store location may then be obtained, and the routine 500 may then determine whether the retail store location is over- or under-performing relative to the demographics within its determined geographic boundary.

It will be understood that the blocks of the routine 500 may be combined, separated, varied, or carried out in different orders within the scope of the present disclosure. For example, blocks 510 and 512 may be carried out in either order, or blocks 510-514 may be combined. As a further example, all or part of the routine 500 may be incorporated into another routine, such as the geographic location determination routine 600 of FIG. 6. The depicted embodiment of the routine 500 is thus understood to be illustrative and not limiting.

Figure 6:
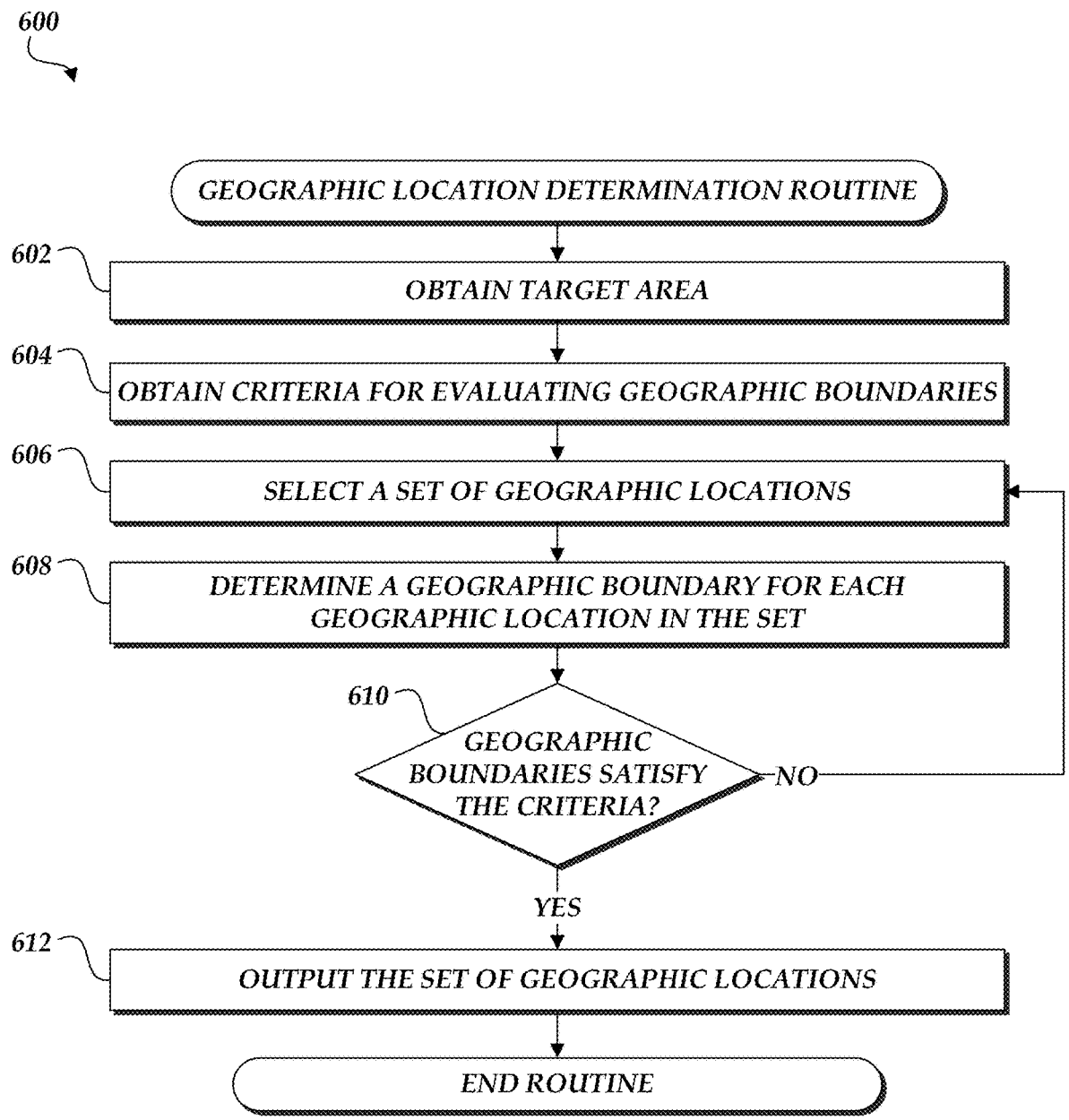
FIG. 6 is a flow diagram depicting an illustrative geographic location determination routine that may be implemented by a geographic boundary determination service in accordance with aspects of the present disclosure.

FIG. 6 is a flow diagram depicting an illustrative geographic location determination routine 600 that may be implemented in accordance with aspects of the present disclosure. The routine 600 may be carried out, for example, by the geographic boundary determination service 120 of FIG. 1. At block 602, a definition of a target area may be obtained. As described above, in some embodiments, the definition of the target area may be obtained through selection via a user interface, such as the user interfaces depicted in FIGS. 3A-3E. In other embodiments, a target area may be provided as an input or as part of a request to invoke the routine 600.

At block 604, one or more criteria may be obtained for evaluating geographic boundaries. Illustratively, the criteria may relate to geographic boundary characteristics such as areas, total populations, target populations, demographic indices or other demographic data, network coverage, predicted sales volumes, or other factors.

At block 606, a set of geographic locations may be selected. In various embodiments, a set of geographic locations may be selected based on an existing set of geographic locations, based on locations selected during a previous execution of block 606, in accordance with a set of rules (e.g., specifying a minimum distance between locations), randomly, or combinations thereof. For example, a set of geographic locations may be selected that include both existing store locations within a target area and a potential new store location, which may be selected randomly from among a set of locations that satisfy a set of rules. In some embodiments, block 606 may be carried out repeatedly (e.g., as part of a Monte Carlo simulation that evaluates potential store locations by randomly selecting sets of potential locations and analyzing the resulting geographic boundaries). In other embodiments, after block 606 is carried out for the first time, a set of geographic locations may be determined based on the previous selection at block 606 and the determinations at decision block 610.

At block 608, a geographic boundary may be determined for each of the geographic locations. Illustratively, geographic boundaries may be determined by carrying out a routine, such as the geographic boundary determination routine 500 of FIG. 5. In some embodiments, various characteristics may also be determined or predicted for the geographic boundaries, such as total areas, populations, network coverage, sales volumes, and other demographics or information.

At decision block 610, a determination may be made as to whether the determined geographic boundaries satisfy the criteria obtained at block 604. As examples, the criteria may specify that each geographic boundary have a minimum size, a maximum population, that the predicted sales volumes within the geographic boundaries be within a specified percentage of each other, that a "before" and "after" change to a geographic boundary (e.g., after the introduction of a new geographic location) be below a specified threshold, and so forth. If the determination at decision block 610 is that the geographic boundaries do not satisfy the criteria, then at block 606 a different set of geographic locations may be determined, and the routine 600 iterates until a set of geographic boundaries is determined that satisfy the criteria.

In some embodiments, the routine 600 may output that a set of geographic locations satisfying the criteria cannot be found. For example, the routine 600 may "time out" after a specified interval or a specified number of iterations of blocks 606-610, and report that no geographic boundaries were found that satisfied the criteria. In further embodiments, the routine 600 may output the set of geographic locations and corresponding geographic boundaries that came closest to satisfying the criteria (e.g., a set in which all but one of the geographic boundaries satisfied the criteria).

If the determination at decision block 610 is that the set of geographic boundaries satisfies the criteria, then at block 612 the set of geographic locations may be output. In some embodiments, the corresponding geographic boundaries may also be output. In further embodiments, the geographic locations and boundaries may be output for display in a user interface, such as the user interface 380 of FIG. 3E.

It will be understood that the blocks of the routine 600 may be combined, separated, varied, or carried out in different orders within the scope of the present disclosure. For example, block 604 may be carried out at any time prior to decision block 610. As a further example, a set of geographic boundaries may be determined at block 606, and corresponding geographic locations may be identified if the boundaries satisfy the criteria. The depicted embodiment of the routine 600 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
    a data store configured to store first computer-executable instructions; and
    a processor in communication with the data store, wherein the first computer executable instructions, when executed by the processor, configure the processor to:
        receive, from a client computing device, a selection of a target geographic region;
        obtain a plurality of geographic locations, wherein individual geographic locations in the plurality of geographic locations correspond to existing retail stores in the target geographic region;
        for individual geographic locations in the plurality of geographic locations:
            determine a trade area boundary for the geographic location, the trade area boundary comprising a set of locations that are identified as being at least one of (i) within a specified distance of the geographic location and (ii) closer to the geographic location than to any other geographic location in the plurality of geographic locations; and determine, based at least in part on the trade area boundary, trade area boundary data, the trade area boundary data comprising wireless network coverage information for the trade area boundary;

determine, based at least in part on the trade area boundary data for the individual geographic locations, a new geographic location in the target geographic region, the new geographic location corresponding to a potential location for a new retail store;

determine a new trade area boundary for the new geographic location, the new trade area boundary comprising a set of locations identified as being at least one of (i) within a specified distance of the new geographic location and (ii) closer to the new geographic location than to any geographic location in the plurality of geographic locations;

determine, based at least in part on the new trade area boundary, an estimated performance metric for the new retail store at the potential location;

determine that the estimated performance metric for the new retail store at the potential location satisfies one or more retail performance criteria;

generate for display a geographic map, the geographic map including at least the target geographic region, the plurality of geographic locations, the new trade area boundary, and the new geographic location; and cause display of the geographic map on the client computing device.

2. The system of claim 1, wherein the data store is configured to store second computer-executable instructions that, when executed by the processor, configure the processor to:

identify one or more neighboring geographic locations within the plurality of geographic locations, wherein the one or more neighboring geographic locations have a trade area boundary that overlaps the new trade area boundary for the new geographic location; and determine, for individual neighboring geographic locations of the one or more neighboring geographic locations, an updated trade area boundary that does not overlap the new trade area boundary.

3. The system of claim 2, wherein the data store is configured to store third computer-executable instructions that, when executed by the processor, configure the processor to:

determine, for at least one neighboring geographic location of the one or more neighboring geographic locations, an estimated performance metric for a neighboring retail store based at least in part on the updated trade area boundary.

4. The system of claim 3, wherein the data store is configured to store fourth computer-executable instructions that, when executed by the processor, configure the processor to:

determine that the estimated performance metric for the neighboring retail store satisfies the one or more retail performance criteria.

5. The system of claim 3, wherein the data store is configured to store fourth computer-executable instructions that, when executed by the processor, configure the processor to:

determine that the estimated performance metric for the at least one neighboring geographic location does not satisfy at least one of the one or more retail performance criteria; and cause display of an indication on the geographic map that the estimated performance metric for the neighboring retail store does not satisfy at least one of the one or more retail performance criteria.

6. A computer-implemented method under control of a processor executing specific computer-executable instructions, the computer-implemented method comprising:

determining a plurality of geographic boundaries, wherein each of the plurality of geographic boundaries is associated with a respective geographic location and a target geographic region;

determining, for each of the plurality of geographic boundaries, trade area boundary data comprising wireless network coverage information for the geographic boundary;

determining whether an estimated performance metric for a new geographic location in the target geographic region satisfies a performance criterion, the estimated performance metric determined based at least in part on a new geographic boundary associated with the new geographic location and trade area boundary data for the new geographic boundary;

generating a user interface comprising:
a geographic map including the new geographic boundary; and
an indication of whether the estimated performance metric satisfies the performance criterion; and causing display of the user interface.

7. The computer-implemented method of claim 6 further comprising determining the new geographic boundary.

8. The computer-implemented method of claim 6 further comprising determining the estimated performance metric based at least in part on trade area boundary data for the new geographic boundary.

9. The computer-implemented method of claim 6 further comprising receiving a user selection of the new geographic location.

10. The computer-implemented method of claim 6 further comprising determining the new geographic location based at least in part on the performance criterion.

11. The computer-implemented method of claim 6, wherein the new geographic location represents a potential change to a geographic location associated with one of the plurality of geographic boundaries.

12. The computer-implemented method of claim 6 further comprising:

removing a first geographic boundary from the plurality of geographic boundaries, wherein the existing geographic boundary is associated with a first geographic location;

identifying a neighboring geographic boundary that borders the first geographic boundary, wherein the neighboring geographic boundary is associated with a neighboring geographic location;

updating the neighboring geographic boundary to form an updated neighboring geographic boundary that overlaps at least a portion of the first geographic boundary;

determining whether an updated estimated performance metric for the neighboring geographic location satisfies the performance criterion, wherein the updated estimated performance metric is determined based at least in part on the updated neighboring geographic boundary; and causing display, in the user interface, of an indication of whether the updated estimated performance metric satisfies the performance criterion.

13. The computer-implemented method of claim 12, wherein the first geographic location corresponds to a retail store that is closing.

14. The computer-implemented method of claim 12 further comprising causing display of a difference between the updated estimated performance metric for the neighboring geographic location and a previously determined performance metric for the neighboring geographic location.

15. The computer-implemented method of claim 6, wherein the geographic map identifies one or more geographic boundaries overlapped by the new geographic boundary.

16. A non-transitory computer-readable medium storing computer-executable instructions that, when executed by a processor, configure the processor to:
   determine, for each of a plurality of geographic boundaries, trade area boundary data comprising wireless network coverage information for the geographic boundary, wherein each of the plurality of geographic boundaries is associated with a respective geographic location and a target geographic region;
   determine whether an estimated performance metric for a new geographic location in the target geographic region satisfies a performance criterion, the estimated performance metric determined based at least in part on:
      a new geographic boundary associated with the new geographic location; and
      trade area boundary data comprising wireless network coverage information for the new geographic boundary; and
   cause display of a user interface comprising:
      a geographic map that includes the new geographic boundary; and
      an indication of whether the estimated performance metric satisfies the performance criterion.

17. The non-transitory computer-readable medium of claim 16 storing further computer-executable instructions that, when executed by the processor, configure the processor to determine the plurality of geographic boundaries.

18. The non-transitory computer-readable medium of claim 17, wherein the plurality of geographic boundaries is determined based at least in part on the geographic location associated with each geographic boundary satisfying the performance criterion.

19. The non-transitory computer-readable medium of claim 16 storing further computer-executable instructions that, when executed by the processor, configure the processor to determine, for a geographic location associated with a geographic boundary that overlaps the new geographic boundary, an updated geographic boundary and an updated performance metric.

20. The non-transitory computer-readable medium of claim 16, wherein the performance criterion is based at least in part on the wireless network coverage information.

* * * * *